United States Patent
Kawakami et al.

(10) Patent No.: US 6,495,289 B1
(45) Date of Patent: *Dec. 17, 2002

(54) LITHIUM SECONDARY CELL WITH AN ALLOYED METALLIC POWDER CONTAINING ELECTRODE

(75) Inventors: Soichiro Kawakami, Nara; Shinya Mishina, Kawasaki; Naoya Kobayashi, Nara; Masaya Asao, Tsuzuki-gun, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,825

(22) Filed: Apr. 2, 1998

Related U.S. Application Data

(62) Division of application No. 08/543,896, filed on Oct. 17, 1995, now Pat. No. 5,795,679.

(30) Foreign Application Priority Data

Oct. 19, 1994 (JP) ................................. 6-279873

(51) Int. Cl.[7] .......................... H01M 4/42; H01M 4/52; H01M 4/58
(52) U.S. Cl. ...................... 429/229; 429/220; 429/223; 429/231.5; 429/216
(58) Field of Search ............................ 429/229, 216, 429/220, 221, 212, 223, 225, 231.5; 420/513

(56) References Cited

U.S. PATENT DOCUMENTS

| | | | | |
|---|---|---|---|---|
| 4,427,751 A | * | 1/1984 | Furukawa et al. | 429/206 |
| 4,439,466 A | * | 3/1984 | Chu | 427/123 |
| 4,707,911 A | * | 11/1987 | Kober et al. | 29/623.5 |
| 4,861,688 A | * | 8/1989 | Miura et al. | 429/206 |
| 4,957,826 A | | 9/1990 | Cheiky | 429/27 |
| 4,957,827 A | | 9/1990 | Kordesch et al. | 429/229 |
| 5,122,375 A | * | 6/1992 | Sklarchuk et al. | 429/229 |
| 5,240,793 A | * | 8/1993 | Glaeser | 429/206 |
| 5,382,482 A | | 1/1995 | Suga et al. | 429/206 |
| 5,429,895 A | | 7/1995 | Lian et al. | 429/223 |
| 5,526,223 A | | 6/1996 | Wu et al. | 429/221 |
| 5,721,065 A | * | 2/1998 | Collien et al. | 429/29 |
| 5,824,434 A | * | 10/1998 | Kawakami et al. | 429/209 |

FOREIGN PATENT DOCUMENTS

| | | | | |
|---|---|---|---|---|
| JP | 62123653 A | * | 6/1987 | |
| JP | 63006748 A | * | 1/1988 | |
| JP | 09055206 A | * | 2/1997 | |

OTHER PUBLICATIONS

Ebbing, Darrell. General Chemistry. Houghton Mifflin Company. pp. 700–701, 825, 909, 1996, No month.*

Brady, James and Holum, John. Chemistry. John Wiley & Sons, Inc. p. 538, 1993, No month.*

N. Kumagai et al., "Cycling behaviour of lithium–aluminum alloys formed on various aluminum substrates as negative electrodes in secondary lithium cells", Journal of Applied Electrochemistry, vol. 22, No. 7, Jul. 1992, pp. 620–627.

* cited by examiner

*Primary Examiner*—Carol Chaney
*Assistant Examiner*—Tracy Dove
(74) *Attorney, Agent, or Firm*—Fitzpatrick, Cella, Harper & Scinto

(57) ABSTRACT

In Lithium secondary cells, alkali secondary cells and bromine-zinc secondary batteries capable of retarding the growth of a dendrite, which would occur at the time of charging thereof and result in performance degradation, and having high energy densities and long cycle lives, a method for forming a material of a negative electrode of such a secondary cell or battery and a method for handling the material of the negative electrode are provided. The secondary cell or battery is provided with positive and negative electrodes separated from each other by a separator in an electrolyte contained in a case. The negative electrode is made of metallic powder alloyed with at least an amphoteric metal which reacts with both of an acid and an alkali.

18 Claims, 4 Drawing Sheets

LITHIUM SECONDARY CELL WITH AN ALLOYED METALLIC POWDER CONTAINING ELECTRODE

This is a divisional application of application Ser. No. 08/543,896 filed on Oct. 17, 1995, which is now U.S. Pat. No. 5,795,679.

BACKGROUND OF THE INVENTION

1. Field of the Invention

The present invention generally relates to a secondary cell or battery and more particularly to a secondary cell utilizing a lithium ionic reaction or using zinc (or a zinc alloy) as a negative electrode, whereby the growth of a dendrite of lithium or zinc, caused by repetition of the charging and discharging, can be restrained and long battery life realized.

2. Description of the Related Art

Recently, it has been pointed out that there is a possibility of global warming owing to the green house effect of increasing atmospheric carbon dioxide. Thermal power plants convert thermal energy obtained by burning fossil fuels and so on into electrical energy. Burning of fossil fuels is, however, accompanied by carbon dioxide emissions. Thus, it has become difficult to increase the number of thermal power plants. Accordingly, it has been being proposed to perform what is called load leveling, namely, to a load an electric dynamo by storing night power, which is surplus power, in secondary batteries installed in ordinary homes for the purpose of utilizing the electric dynamo effectively. Moreover, there has been an ever-increasing demand for the development of light-weight high-energy-density secondary batteries for use in electric vehicles that do not discharge substances regarded as air pollution, which include $CO_x$, $NO_x$ and hydrocarbon, and of small-size light-weight high-performance secondary cells as power sources for portable equipment such as notebook personal computers, word processors, video cameras and portable telephones.

The development of one of such high-performance secondary cell, namely, a lithium-ion cell of the rocking chair type employing an intercalation compound, to which lithium ions are intercalated, as a positive active material (namely, an anode active material) and further employing carbon as a negative active material (namely, a cathode active material) has been advanced. A part of the lithium-ion cells of such a type is proceeding toward practical utilization. It cannot be said that presently available lithium-ion cells attain high energy density which is an essential feature of the lithium cell employing metallic lithium as a negative active material.

In the case of a lithium secondary cell, dendritic lithium is sometimes deposited on a negative electrode during charging operation. This phenomenon may result in causing internal short between positive and negative electrodes of the cell or in self-discharge.

Further, in the Journal of Applied Electrochemistry vol. 22 (1992), pp. 620 to 627, there has been described a lithium secondary cell that employs aluminum foil, the surface of which is etched, as a negative electrode.

This lithium secondary cell, however, does not have practically satisfactory performance because the growth of a dendrite occurs despite countermeasures taken by this secondary cell, when the cycle of charge and discharge is repeated a practical number of times.

Especially when the negative electrode is faced with the positive electrode in the proximity thereof across a separator, the life or duration of the cycle of charge and discharge sometimes decreases. Many of such lithium secondary cells actually produced have extremely short lives.

Similarly as in the case of the lithium secondary cells which employ lithium alloys or aluminum as negative electrodes, nickel-zinc batteries and air-zinc cells have drawbacks in that some of the produced batteries or cells of such types have extremely short lives.

Such being the case, the advent of high-energy-density long-cycle-life lithium secondary cells, nickel-zinc secondary cells, air-zinc batteries and bromine-zinc secondary batteries is awaited. The fact of the matter, however, is that the aforementioned problems have to be solved in conventional secondary cells and batteries of such types.

SUMMARY OF THE INVENTION

Accordingly, the present invention is directed to solving the aforementioned problems.

Further, it is an object of the present invention to provide high-energy-density long-cycle-life lithium secondary cells, nickel-zinc secondary cells, air-zinc batteries and bromine-zinc secondary batteries.

Moreover, it is another object of the present invention to provide a method for forming materials of the negative electrodes of such lithium secondary cells, nickel-zinc secondary cells, air-zinc batteries and bromine-zinc secondary batteries.

Furthermore, it is still another object of the present invention to provide a method for handling the materials of the negative electrodes of such lithium secondary cells, nickel-zinc secondary cells, air-zinc batteries and bromine-zinc secondary batteries.

To achieve the foregoing objects, in accordance with an aspect of the present invention, there is provided a secondary cell which includes positive and negative electrodes separated from each other by a separator in an electrolyte contained within a case therefor. Further, the negative electrode is made of metallic powder alloyed with at least a metal (hereunder sometimes referred to as an amphoteric metal) which reacts with both of an acid and an alkali. Moreover, the metallic powder of the present invention has a large specific surface area. Preferably, the specific surface area of this metallic powder is equal to or more than $10 \, m^2/g$ and the grain size (or particle diameter) thereof is equal to or less than $100 \, \mu m$. The amphoteric metal is made of at least one kind of a metal selected from aluminum, zinc, tin and lead. Furthermore, it is preferable that this amphoteric metal is alloyed with at least one or more kind of metal from among nickel, cobalt, copper, titanium and iron. Moreover, what is called an element ratio expressed in percent of the weight of the latter metal to the amphoteric metal is preferably equal to or less than 60 percent.

Further, it is preferable that the metallic powder is micro-capsulated with a coating or film. The coating of this micro-capsule is preferably made of a material which neither reacts with the electrolyte and is nor soluble in an electrolyte solution and is thus stable and is permeable to ions involved in a cell reaction but is resistant to oxidizing in the presence of oxygen. Moreover, the coating is constituted by an insulator (or a semiconductor) having a molecular structure, in which clearances or pores larger than the ions involved in the cell reaction are provided. Preferably, a material of this coating is a metallic oxide. Furthermore, this metallic oxide is preferably the oxide of at least one kind of a metal from among tungsten, molybdenum, titanium, vanadium, niobium, zirconium, hafnium, tantalum and chromium.

Preferably, another material of this coating is an organic polymer of a fluororesin, a silicone resin, a polyolefine of polyethylene or polypropylene, a titanium resin, a polymer of derivatives of a macrocyclic compound, or a polymer of derivatives of aromatic hydrocarbon. Additionally, this coating may be made of a composite material of a metallic oxide and an organic material.

Further, it is preferable that the surface of the negative electrode made of the micro-capsulated metallic powder is coated with an insulating film or a semiconductor film which is not soluble in the electrolyte solution and is permeable to the ions involved in the cell reaction but is not permeable to a lithium metal (or a zinc metal) serving as a negative active material. Moreover, it is desirable that the coating has the peak size of the clearances in the molecular structure or of the pores within a range of 0.15 to 100 nanometers. Furthermore, this coating may be made of an insulating film or a semiconductor film.

Additionally, secondary cells or batteries, to which the present invention can be applied, are lithium cells in which the oxidation and reduction of lithium ions are performed by charging and discharging reactions, and nickel-zinc secondary batteries, air-zinc secondary batteries and bromine-zinc secondary batteries, the negative electrode of which is made of at least a zinc metal.

Further, the secondary cell of the present invention is characterized in that the negative electrode is made of metallic powder alloyed with an amphoteric metal which reacts with both of an acid and an alkali, that the elution of the amphoteric metal is performed by selective etching thereof so that the specific surface area is increased. Furthermore, it is preferable that the amount of the amphoteric metal eluted by the etching is equal to or less than 60 percent. The metallic powder, whose specific surface area is increased, may be then etched by an acid so as to further increase the specific surface area. Moreover, the etched metallic powder used in the secondary cell of the present invention is kept or preserved by being cut off from air, or kept in an oxgen-free solvent.

In the alloying of the amphoteric metal powder, the amphoteric metal reacts with both of an acid and an alkali. Thus, metallic powder having pores and a high specific surface area can be obtained by selectively etching and removing the amphoteric metal from the alloy of the amphoteric metal powder.

The negative electrode of the secondary cell of the present invention is made of such porous metallic powder. Thereby, the specific surface area is increased. Further, the contact area between the negative electrode and the electrolyte solution is increased. Moreover, the diffusion of lithium ions (incidentally, in the case of an alkaline cell, hydrogen ions) into the negative electrode can be facilitated. Thus, the substantial current density of current flowing through the surface portion of the negative electrode can be reduced at the time of the charge and discharge. As a result, the growth of a dendrite of lithium or zinc is retarded.

Furthermore, the etched powder of the alloy of the amphoteric metal can be safely handled without greatly reducing the specific surface area thereof by micro-capsulating the powder by the coating or film made of an insulating material or a semiconductor material which neither reacts with the electrolyte and is not soluble in an electrolyte solution and is thus stable and is permeable to ions involved in a cell reaction.

Namely, metallic powder having a high specific surface area is very active in air and thus is easily oxidized. In some cases, such metallic powder ignites. In the case where the metallic powder having a high specific surface area is oxidized, the pores are crushed and the specific surface area is decreased. Thus, precautions are required to handle the metallic powder. For example, the metallic powder should be handled in an atmosphere from which oxygen has been removed. In the case of the secondary cell of the present invention, the micro-capsulation of the powder of the alloy of the amphoteric metal obviates the necessity of such handling of the powder.

Furthermore, this powder of the alloy of the amphoteric metal is used in a secondary cell having a lithium or zinc negative electrode. Thereby, the lithium or zinc negative active material, which is deposited on the surface of the powder of the alloy of the etched amphoteric metal at the time of charging, can be prevented from directly coming into contact with the electrolyte solution. Consequently, a secondary cell can be obtained, the performance of which never degrades.

Other features, objects and advantages of the present invention will become apparent from the following description of preferred embodiments with reference to the drawings in which like reference characters designate like or corresponding parts throughout several views.

DETAILED DESCRIPTION OF THE PREFERRED EMBODIMENTS

The preferred embodiments of the present invention will be described in detail by referring to the accompanying drawings.

Figure 1:
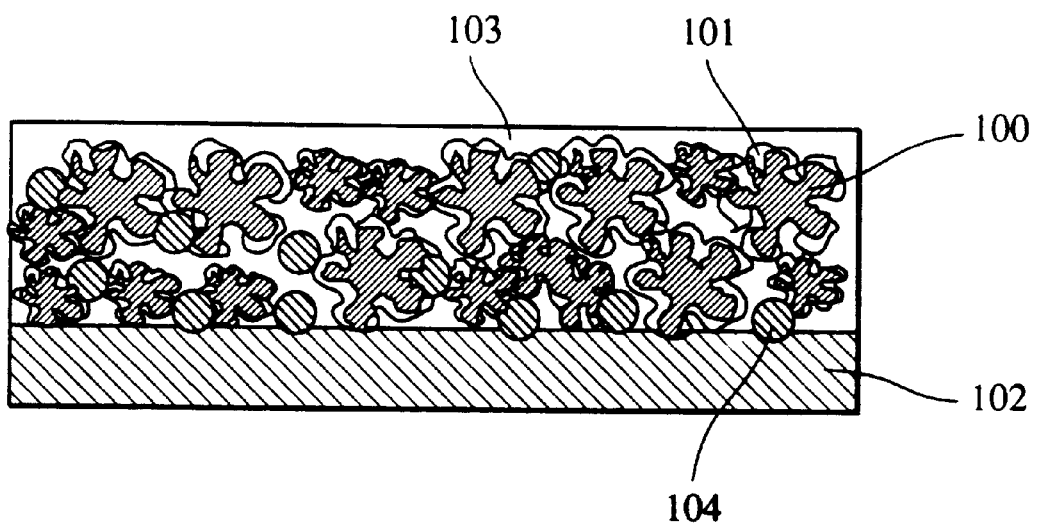
FIG. 1 is a schematic sectional diagram illustrating a section of a negative electrode which is a characteristic feature of a secondary cell of the present invention.

FIG. 1 is a schematic sectional diagram for illustrating a section of an example of a negative electrode of a secondary cell embodying the present invention. The negative electrode of the secondary cell of the present invention is formed by first micro-capsulating a powder 100 of an alloy of an amphoteric metal, on which an etching elution processing has been performed, by using a coating or film 101 made of an insulating material or a semiconductor material which neither reacts with the electrolyte and is nor soluble in an electrolyte solution and is thus stable and is permeable to ions involved in a cell reaction. Then, the powder 100 is bound to a collector 102 using a binding agent 103 into which a conductive auxiliary substance 104 is mixed. Thus, the negative electrode is completed.

Figure 2:
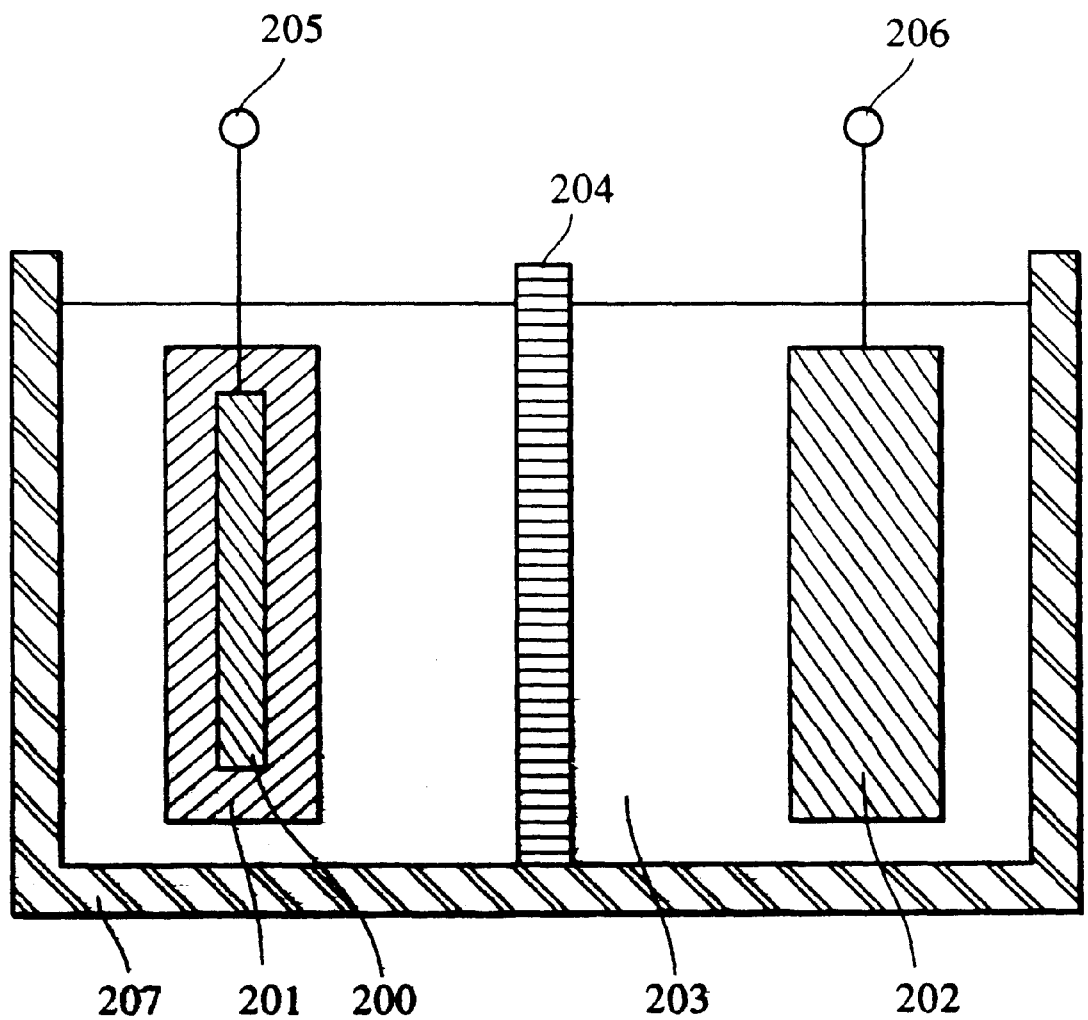
FIG. 2 is a schematic diagram illustrating an example of the configuration of the secondary cell of the present invention.

The secondary cell of the present invention as illustrated in FIG. 2 is formed by using the negative electrode having the aforementioned configuration. The secondary cell of FIG. 2 is constructed by providing a positive electrode 202 having a terminal 206 and a negative electrode (200, 201) having a terminal 205 through a separator 204 in an electrolyte (or electrolyte solution) 203 contained in a case 207.

The negative electrode consists of a negative-electrode collector 200 and a layer 201 of powder of an alloy of an amphoteric metal, which is formed thereon and has undergone an etching solution processing and micro-capsulation.

The amphoteric metal reacts with both of an acid and an alkali. A metallic powder having pores and a high specific surface area can be obtained from the powder of the alloy of the amphoteric metal by selectively performing an etching elution on the amphoteric metal. Preferably, the particle diameter of the powder of the alloy of the amphoteric metal is equal to or less than 100 μm. More preferably, the particle diameter is equal to or less than 10 μm. The negative electrode of the present invention is composed of the porous metallic powder formed in this manner and a collecting member.

An electrode obtained by forming a layer of powder of an alloy of a porous amphoteric metal, which is made by selectively etching and eluting a part of an amphoteric metal, on a metallic collecting member can be used as a practical negative electrode. A method having the step of mixing a resin or low-melting glass into a porous alloy powder, from which a part of the amphoteric metal is eluted, as a binding agent, the step of adding an organic solvent or the like thereto, the step of applying a paste, the viscosity of which is regulated, onto the metallic collecting member or filling this member with such a paste and the step of then drying or sintering such a collecting member may be used as a practical method for forming the layer made of the powder of the alloy of the amphoteric metal on the collecting member. In the case of using a resin as the binding agent, it is desirable to use the resin which is stable in an electrolyte solution, for example, polytetrafluoroethylene, polyvinylidene fluoride, polyethylene, polypropylene, ethylene propylene copolymer or ethylene propylene dien terpolymer. Among the aforementioned resins, those having elongation percentage of more than 200 percent are more preferable. In the case of employing a resin as the binding agent, only a small amount of the active material falls away therefrom even if the expansion or contraction occurs at the time of the charge and discharge but the ability of collecting an electric curent is degraded. Thus, it is preferable for improvement of collecting ability to add carbon powder such as carbon black, Ketjen-black or acetylene black to the binding agent as the conductive auxiliary agent, or alternatively to add carbon fibers, metal fibers, or carbon fibers coated with metals thereto. In contrast, in the case of using low-melting glass, the ability of collecting is high but the mechanical strength due to the expansion and contraction or the bending of the electrode is weak in comparison with the case of using a resin.

The collector has the functions of supplying electric current to be efficiently consumed in a cell reaction at the time of charge and discharge and of collecting electric current generated in the cell reaction at such time. Therefore, a material, which has high electric conductivity and is inactive in the cell reaction, is desirable for the material of the collector. Further, nickel, titanium, copper, aluminum, stainless steel, platinum, palladium, gold, zinc, various kinds of alloys and a compound metal of more than one kind of the aforementioned materials may be the desirable materials for the collector. Each of plate-like, foil-like, mesh-like, sponge-like, fiber-like, punching-metal-like and expanded-metal-like shapes may be employed as the shape of the collector.

In a method of making powder of an alloy of an amphoteric metal, the amphoteric metal is made to react with metallic salts such as halogenosalt, nitrate, sulfate, acetate, formate and oxalate of nickel, cobalt, copper, titanium and iron in the solution thereof, or the amphoteric metal and metals such as nickel, cobalt, copper, titanium and iron are melted. At that time, powder of the alloy of the amphoteric metal of various particle sizes (or diameters) and shapes can be obtained by changing the kinds of used compounds of nickel, cobalt, copper, titanium and iron, the concentration and temperature of the solution of the compound, the particle size and shape of the powder of the amphoteric metal, the kind of a melting furnace or the melting temperature.

In an example of making the metallic salt react with the amphoteric metal, the water solution of nickel chloride is added to warm water into which aluminum is diffused, and the warm water solution is then agitated so as to make the nickel and the aluminum react with each other.

Further, in an example of obtaining powder of an alloy of an amphoteric metal by a melting method, the amounts of the metals such as nickel, cobalt, copper, titanium and iron and of the amphoteric metal are first adjusted to predetermined amounts. Then, these metals are prepared at a temperature higher than the melting points thereof in the melting furnace in a vacuum or in an atmosphere of inert gases such as hydrogen, helium, nitrogen and argon gases. Subsequently, the prepared metals are cooled and crushed. Thus, the powder of the alloy of the amphoteric metal is obtained. A high-frequency fusion furnace, an electric resistance furnace, an arc melting furnace and a plasma jet melting furnace may be used as the melting furnace. further, a gas atomizing method, a centrifugal injection method or the like are used so as to obtain finer powder and to change the shapes of powder particles. Furthermore, bowl-like, flake-like, spike-like and spherical shapes are employed as the shapes of particles of the powder of the alloy of the amphoteric metal. Furthermore, it is preferable that the element ratio expressed in percent of the weight of the metals or elements such as nickel, cobalt, copper, titanium and iron to the amphoteric metal is preferably equal to or less than 60 percent. More preferably, such a ratio is equal to or less than 50 percent. This is because the alloy of the amphoteric metal becomes a stable intermetallic compound and does not react with an etchant. Thus, the powder of the metallic alloy having a high specific surface area can not be obtained if such a ratio is more than 65 percent. Additionally, gallium, cesium and strontium are used as the amphoteric metal, in addition to aluminum, zinc, tin and lead. The amphoteric metals such as aluminum and lead, which are easily alloyed with lithium, are suitable for the negative electrode of a lithium secondary cell. Incidentally, zinc is suitable for the amphotetic metal to be used in the negative electrodes of nickel-zinc secondary batteries, air-zinc secondary batteries and bromine-zinc secondary batteries.

Next, the etching of the powder of the alloy of the amphoteric metal will be described hereinbelow. To obtain the porous powder of the alloy of the amphoteric metal by selectively etching and eluting a part of the amphoteric metal from the powder of the alloy thereof, a uniform material having a large specific surface area can be obtained by etching the powder of the alloy thereof. Further, although an electrode formed on the metallic collecting member from the powder of the alloy of the amphoteric metal and the binding agent can be etched, a method of etching the powder of the alloy of the amphoteric metal is desirable. This is because each particle of the powder can be uniformly etched and thus high-quality and high-performance materials of negative electrodes, which exhibit a small range of variation in performance, can be obtained.

The techniques of chemical etching, electrochemical etching and plasma etching may be employed as an etching method. The chemical etching is performed by making the powder react with an acid or an alkali. In the case of a practical example, phosphoric acid, sulfuric acid, hydrochloric acid, nitric acid, acetic acid, hydrofluoric acid, potassium hydroxide, sodium hydroxide, or lithium hydroxide, or the mixture solution of these acids may be used as an etchant for the powder of the alloy of the metal. Most of non-amphoteric metals are not soluble in an alkali. Therefore, an alkali solution is favorable. In the case of performing the chemical etching, it is preferable to use an etchant by which a selective etching can be performed, namely, the rate of etching an amphoteric metal can be different from that of etching a non-amphoteric metal. The electrochemical etching is done by applying an electric field across the counter electrodes in the electrolyte solution and electrochemically eluting a part of the amphoteric metal as metallic ions after a negative electrode is preliminarily formed from the powder of the alloy of the amphoteric metal. Further, phosphoric acid, sulfuric acid, chromic acid or the mixture solution of these acids may be used as the electrolyte solution for the powder of the alloy of the metal containing aluminum which is amphoteric metal. Moreover, the plasma etching is performed by first producing a plasma gas from an etching gas and next making reactive ions or radicals react with the alloy of amphoteric metal. Incidentally, tetrachloromethane, tetrafluoromethane, chlorine, trichloromonofluoromethane, dichlorofluoromethane, chlorotrifluromethane and so on may be used as the etching gas which is a raw material.

Preferably, an amount expressed in percent of the weight of the amphoteric metal eluted from the powder of the alloy thereof by performing the etching is equal to or less than 60 percent. More preferably, such an amount is equal to or less than 50 percent. This is because the amount of the amphoteric metal, such as aluminum, to be alloyed with lithium is decreased and thus the absolute capacity of the cell is decreased in the case of a lithium secondary cell if the amphoteric metal is eluted excessively, and the strength of the powder of the alloy of the amphoteric metal is decreased after the elution. Moreover, the negative electrode is crushed when formed, and this results in reduction in specific surface area.

Moreover, the effective current density of the electrode decreases in inverse proportion to the specific surface area of the powder of the alloy of the eluted amphoteric metal. Thereby, the growth of a dendrite of a lithium metal (incidentally, a zinc metal in the case of an alkali secondary cell) can be retarded. Furthermore, the reaction area, on which the amphoteric metal is alloyed with lithium, increases. Thus, the change in volume at the time of forming the alloy of the amphoteric metal and lithium can be retarded. It is, therefore, preferable to maximize the specific surface area of the powder of the metallic alloy. Practically, the specific surface area is preferably equal to or more than 10 m²/g. More preferably, the specific surface area is equal to or more than 30 m²/g. Thereby, the negative electrode, whose specific surface area is larger than that of a negative electrode formed from a plate-like metal, can be produced.

Further, it is preferable that after eluting, the powder of the alloy of the amphoteric metal is handled as follows. Namely, the formed powder is cut off from the air. Moreover, in the case where water is used as the solvent, the dissolved oxygen is reduced as much as possible. The reason is that the powder of the alloy of the amphoteric metal has a large specific surface area and a high activity after the amphoteric metal is etched from the powder of the alloy thereof. A desirable condition for keeping the powder of the alloy of the amphoteric metal is that the powder is kept in water or alcohol. More preferably, an antioxidant such as sodium phosphate is added thereto. Furthermore, the dissolved oxygen can be removed from the solvent by letting inert gases, such as hydrogen, helium, nitrogen and argon gases, into the solvent.

The micro-capsulation of the powder of the alloy of the amphoteric metal having high specific surface area will be described hereinbelow.

A desirable material for the micro-capsule is an insulating material or a semiconductor material, which neither reacts with the electrolyte and nor is soluble in an electrolyte solution and is thus stable and permeable to ions involved in a cell reaction but is resistant to oxidizing in the presence of oxygen and has a molecular structure having clearances larger than the ions involved in the cell reaction or has pores. In order for the material of the coating to neither react with the electrolyte and nor be soluble in an electrolyte solution and thus be stable, the material of the coating preferably has a cross-linking or bridging structure if the material of the coating is a polymetric material.

Moreover, as a method of forming pores permeable to ions involved in a cell reaction other than the molecular structure, there has been cited a method having the steps of mixing an extractable substance, for example, a salt such as an electrolyte into the material of the coating of the micro-capsule when forming the coating is formed, and eluting or removing such a substance after the coating is formed. Furthermore, an organic polymer of a fluororesin, a silicone resin, a polyolefine of polyethylene or polypropylene, a titanium resin, a polymer of derivatives of a macrocyclic compound, a polymer of derivatives of aromatic hydrocarbon, or a composite material of a metallic oxide and an organic material may be used as a practical material. Among the aforementioned materials for the coating, metallic oxides such as tungsten oxide, molybdenum oxide, vanadium oxide and titanium oxide, a polymer of derivatives of a macrocyclic compound, or a polymer of derivatives of aromatic hydrocarbon and fluororesin, are effective, particularly in a lithium secondary cell having lithium as the negative active material.

Further, a method of keeping the etched powder of the alloy of the amphoteric metal in water, or in a higher fatty acid, or in the presence of an inert gas and then mixing a micro-capsuled material of a coating thereinto so as to form the coating, or a method of forming a coating by utilizing the techniques of sputtering, electron beam evaporation, cluster ion vapor deposition, thermal chemical vapor deposition (CVD), or plasma CVD under a reduced pressure or in the presence of an inert gas may be employed as a practical method for the micro-capsulation.

Hereunder, a method of forming a tungsten oxide film will be described by way of example. First, the powder of the alloy of the amphoteric metal, the specific surface area of which is increased by performing the etching, is immersed into the aqueous solution of polytungustic peroxide prepared by the reaction between metallic tungsten (or tungsten carbide) and hydrogen peroxide. Then, the powder of the alloy is dried. Subsequently, the powder of the alloy of the amphoteric metal can be obtained by performing micro-capsulation using a tungsten oxide film. The polytungustic peroxide can be also obtained by performing an ion exchange between sodium and hydrogen by letting the aqueous solution of sodium tungustate into an ion exchange resin which is strongly acid. Additionally, a composite material can be produced by mixing an organic polymer into the polytungustic peroxide solution. Further, a micro-capsuled coating, in which pores are formed, can be produced by first mixing an inorganic salt thereinto and thereafter removing the salt therefrom. A molybdenum oxide film and a vanadium oxide film can be similarly obtained. As examples of other glass-like inorganic materials for a coating, silica, titanium oxide, alumina, zirconium oxide, magnesium oxide, tantalum oxide, tin oxide, indium oxide, iron oxide, chromium oxide, aluminum phosphate, iron phosphate and silicone phosphate can be cited.

A method of forming the glass-like inorganic coating can be performed by the step of first diffusing the powder of the alloy of the amphoteric metal into an alcohol solution or the like of a metallic organic compound such as metallic alkoxide by utilizing a sol-gel process and the step of then adding an acid or salt and water thereto and the step of performing the hydrolysis thereof, thereby forming a micro-capsulated coating made of an inorganic oxide. Alternatively, a method having the step of diffusing the powder of the alloy of the amphoteric metal into a sol solution prepared by utilizing the sol-gel process and the step of thereafter drying thereof may be used to form a micro-capsuled coating. Certainly, a composite material can be produced from an organic polymer. Thereby, the strength of the electrode against cracking and peeling can be enhanced. Acetylacetone complex salt, alkyl metallic compound, acetylacetone metallic salt, naphtenate metallic salt and octyl metallic acid may be used as metallic organic compounds which are materials of a glass-like inorganic coating other than alkoxide.

Epoxy resin, polyester, polyimide, polyethylene, polypropylene, polyurethane, polystyrene, polyethylene glycol, nylon, fluororesin and silicone resin are examples of the organic polymer for forming two composite material. Further, as a cross-linking agent for the polymer, diisocyanate, polyisocyanate prepolymer, block isocyanate, organic peroxide, polyamine, oxime, nitroso compound, sulfur and sulfur compound, selenium, magnesium oxide, lead oxide and zinc oxide can be used. In addition to the method of utilizing the cross-linking agent, there is another method of performing polymerization or conducting a cross-linking on a polymer by irradiating radiation, an electron beam or ultraviolet. Further, when producing a composite material from a polymer, the strength of the composite coating can be increased by adding an organic metallic compound, such as a silane coupling agent or a titanate coupling agent, thereto.

Next, the coating of the surface of the negative electrode will be described.

Retarding the generation of a dendrite during charging can be enhanced by coating the negative electrode with a film which is permeable to ions involved in a cell reaction but is resistant to oxidizing in the presence of oxygen and has a molecular structure having clearances larger than the ions involved in the cell reaction and pores. The diameters of a lithium ion and a zinc ion are 0.15 nanometers or so. Therefore, the insulating or semiconductor coating, which is permeable to ions involved in a cell reaction, should have pores or clearances of diameters which are equal to or larger than those of the lithium and zinc ions. Moreover, the insulating or semiconductor coating is required to have a distribution peak of the diameters of the pores in the range of less than 100 nanometers. Preferably, this peak should be within a range from 0.15 to 100 nanometers. More preferably, this peak should be within a range from 0.2 to 10 nanometers. Furthermore, it is also required that the insulating material or the semiconductor material of the coating neither react with the electrolyte (or electrolyte solution) and nor dissolve therein and thus is stable. It is, therefore, preferable that the insulating material or the semiconductor material of the formed negative material have a bridged polymer structure.

It is more preferable that the insulating material or the semiconductor material have an electron-denotive element or group, that the electron-denotive element thereof have an unpaired electron, or an electron pair or a d electron, that the electron-denotive group or radical of the insulating material or of the semiconductor material have a $\pi$-electron and that the insulating or semiconductor material having an electron-denotive element is made of materials having one or more kinds of elements selected from oxygen, nitrogen and sulfur. Practical examples of the insulating or semiconductor material are a glass-like metallic oxide which has a macrocyclic compound structure, or an aromatic ring structure, a structure containing a fluororesin, a structure including an ether linkage, a structure having a carbonyl group, or a structure containing phosphorous and nitrogen atoms alternatively arranged and bonded by double bonds. As more practical insulting or semiconductor materials, a polymer of derivatives of a macrocyclic compound, a polymer of derivatives of aromatic hydrocarbon, a fluororesin, a silicone resin, a titanium resin, organic or inorganic polymers of an inorganic oxide, a nitride, a carbide and a halide, or a composite material of organic and inorganic polymers may be used. Especially, a polymer of derivatives of a macrocyclic compound, a polymer of derivatives of aromatic hydrocarbon, and a fluororesin is very useful for the coating material of the negative electrode in a lithium cell.

Next, a lithium cell or battery, to which the present invention can be applied, will now be described.

The positive electrode of such a lithium cell is composed of a collector, a positive active material, a conductive auxiliary agent and a binding agent or the like and is made by being molded on the collector by a mixture of the positive active material, the conductive auxiliary agent and the binding agent. Carbon powder and fibers such as powder-like or fiber-like aluminum, copper, nickel, stainless steel, or carbon black such as Ketjen-black and acetylene black may be used as the conductive auxiliary agent for the positive electrode. Preferably, the binding agent is stable in the electrolyte solution. For example, polytetrafluoroethylene, polyvinylidene fluoride, polyethylene, polypropylene, ethylene propylene copolymer or ethylene propylene dien terpolymer may be used as the binding agent.

As described above, the collector has the functions of supplying electric current to be efficiently consumed in a cell reaction upon charging and of collecting electric current generated in the cell reaction upon discharging. Therefore, a material, which has high electric conductivity and is inactive in the cell reaction, is desirable for the collector material. Further, nickel, titanium, copper, aluminum, stainless steel, platinum, palladium, gold, zinc, various kinds of alloys and a compound metal of more than one kind of the aforementioned materials can be desirable collector materials. Each of plate-like, foil-like, mesh-like, sponge-like fiber-like, punching-metal-like and expanded-metal-like shapes may be employed as the shape of the collector.

Generally, a transition metal oxide, a transition metal sulfide, a lithium transition metal oxide and a lithium transition metal sulfide may be used as the positive active material. Further, elements, each of which has a d- or an f-shell, such as Sc, Y, lanthanoids, actinoioids, Ti, Zr, Hf, V, Nb, Ta, Cr, Mo, W, Mn, Tc, Re, Fe, Ru, Os, Co, Rh, Ir, Ni, Pd, Pt, Cu, Ag and Au are used as transition metal elements of the transition metal oxide and the transition metal sulfide.

Mainly, the elements of the first transition series metals, namely, Ti, V, Cr, Mn, Fe, Co, Ni and Cu are used. The separator has the function of preventing occurrence of a short circuit between the negative and positive electrodes. Further, the separator has the function of holding the electrolyte solution. The separator is required to have pores, through which lithium ions move, and should be insoluble in the electrolyte solution and thus be stable. Therefore, a nonwoven fabric made of glass, polypropylene, polyethylene, fluororesin or polyamide, or of a material having a micropore structure may be used as the separator material. Alternatively, a metallic oxide film having micropores, or a resin film consisting of a composite material made of metallic oxides may be used as the material of the separator. Especially, in the case of employing a multilayer metallic oxide film as the material of the separator, such a separator has advantages in that it resists being pierced with a dendrite and can prevent an occurrence of a short circuit. In the case where a fluororesin film, which is a flame retarder, or a glass or metallic oxide film, which is a non-flammable material, the safety of the cell is enhanced.

The electrolyte can be used just as it is. Alternatively, a solution obtained by dissolving the electrolyte in a solvent or the electrolyte fixed by adding a gelling agent such as a polymer thereto may be used. Generally, the electrolyte solution obtained by making the electrolyte dissolve in the solvent is used by being held by the porous separator. A high conductivity electrolyte is preferable. Preferably, the conductivity of the electrolyte is $1 \times 10^{-3}$ S/cm at 25 degrees centigrade. More preferably, the conductivity of the electrolyte is $5 \times 10^{-3}$ S/cm. Acids such as $H_2SO_4$, HCl and $HNO_3$, salts made from lithium ions ($Li^+$) and Lewis acid ions ($BF_4^-$, $PF_6^-$, $ClO_4^-$, $CF_3SO_3^-$, $BPh_4^-$ (incidentally, "Ph": a phenyl radical)), and mixed salts of these materials are used as the electrolyte. In addition to the aforementioned supporting electrolyte, salts made from cations, such as sodium ions, potassium ions and tetra-alkylammonium ions, and Lewis acid ions may be used. It is also preferable that dehydration and deoxidation are performed sufficiently and preliminarily by, for example, heating the salt under a reduced pressure.

Further, acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolane, sulfolane, nitromethane, dimethyl sulfide, dimethyl sulfoxide, dimethoxyethane, methyl formate, 3-methyl-2-oxazolidinon, 2-methyltetrahydrofuran, 3-propylsydnone, sulfur dioxide, phosphoryl chloride, thionyl chloride and sulfuryl chloride, and a mixture of these compounds can be used as the solvent for the electrolyte. The aforementioned solvent should undergo dehydration which uses activated alumina, molecular sieves, phosphorus pentaoxide and calcium chloride. In the case of some kinds of solvent, it is preferable that the removal of impurities and dehydration are further conducted by distilling the solvent in the presence of an inert gas and in the coexistence of an alkaline metal. Preferably, gelling of the electrolyte solution is performed in order to prevent leakage of the electrolyte solution. It is desirable that a polymer, which absorbs the solvent of the electrolyte solution and swells, for example, polyethylene oxide, polyvinyl alcohol, or polyacrylamide is used as the gelling agent.

Next, a nickel-zinc secondary cell will now be described as another example of a secondary cell, to which the present invention can be applied. There are two types of positive electrodes for the nickel-zinc secondary cell. Namely, one is a positive electrode of the paste type in which the collecting members are directly filled with powder of nickel hydroxide. The other is a positive electrode of the sintered type in which nickel hydroxide is impregnated into pores formed in a sintered plate made of nickel. In the case of a positive electrode of the paste type, the positive electrode can be obtained with a paste made by uniformly mixing nickel hydroxide and additives such as nickel and cobalt together with a binding agent and mixing liquid is applied on the collecting member and then the paste is dried. Further, polyvinyl alcohol, a cellulose type agent such as methyl cellulose and carboxylic methyl cellulose, a polyolefine type agent such as polyethylene, a fluororesin type agent such as polytetrafluoroethylene, a polyamide type agent such as nylon, and a rubber type agent such as ethylene propylene dien terpolymer are used as the binding agent. On the other hand, in the case of a positive electrode of the sintered type, a sintered plate obtained by sintering nickel powder upon a nickel-plated iron perforation plate is first dipped in a mixed solution of a nickel salt serving as a main active material, and a cobalt salt serving as an additive, and thereafter making the sintered plate with an alkali solution of sodium hydroxide or the like, so that the sintered plate is filled with nickel hydroxide. Furthermore, the separator for use in the aforementioned lithium secondary cell can be used as a separator of this nickel-zinc secondary cell. However, in the case of this nickel-zinc secondary cell, the electrolyte solution is a water solvent. Thus, a nonwoven fabric made of hydrophilic nylon, polypropylene, or of hydrophile or the like, or a material having a micropore structure may be used as a material of the separator. Additionally, a solution of sodium hydroxide, potassium hydroxide or lithium hydroxide or a mixed solution thereof is used as the electrolyte solution.

Hereinafter, the shape and structure of the cell of the present invention will be described.

Practically, a variety of cell shapes or configurations have been proposed and used, such as flat, cylindrical, prismatic, sheet, and so forth. Among the cells of these configurations, spiral cylindrical type cell is formed by spirally winding negative and positive electrodes with a separator sandwiched therebetween. When the negative and positive electrodes have small thicknesses, the number of turns of winding can be increased for a given diameter, so that the lengths and, hence, the areas of the electrodes can be increased correspondingly, thus enabling large currents to flow during charging and discharging. Meanwhile, a prismatic cell can make an efficient use of a limited cell accommodation space available in the device which incorporates the cell.

Figure 3:
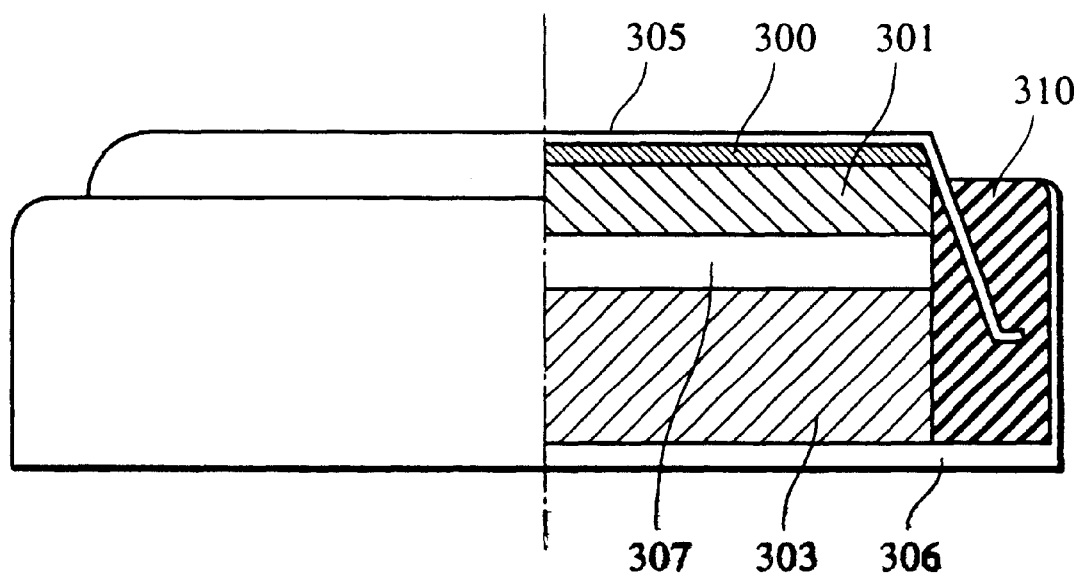
FIG. 3 is a schematic sectional view of a monolayer flat cell, which illustrates an example of the configuration thereof.
Figure 4:
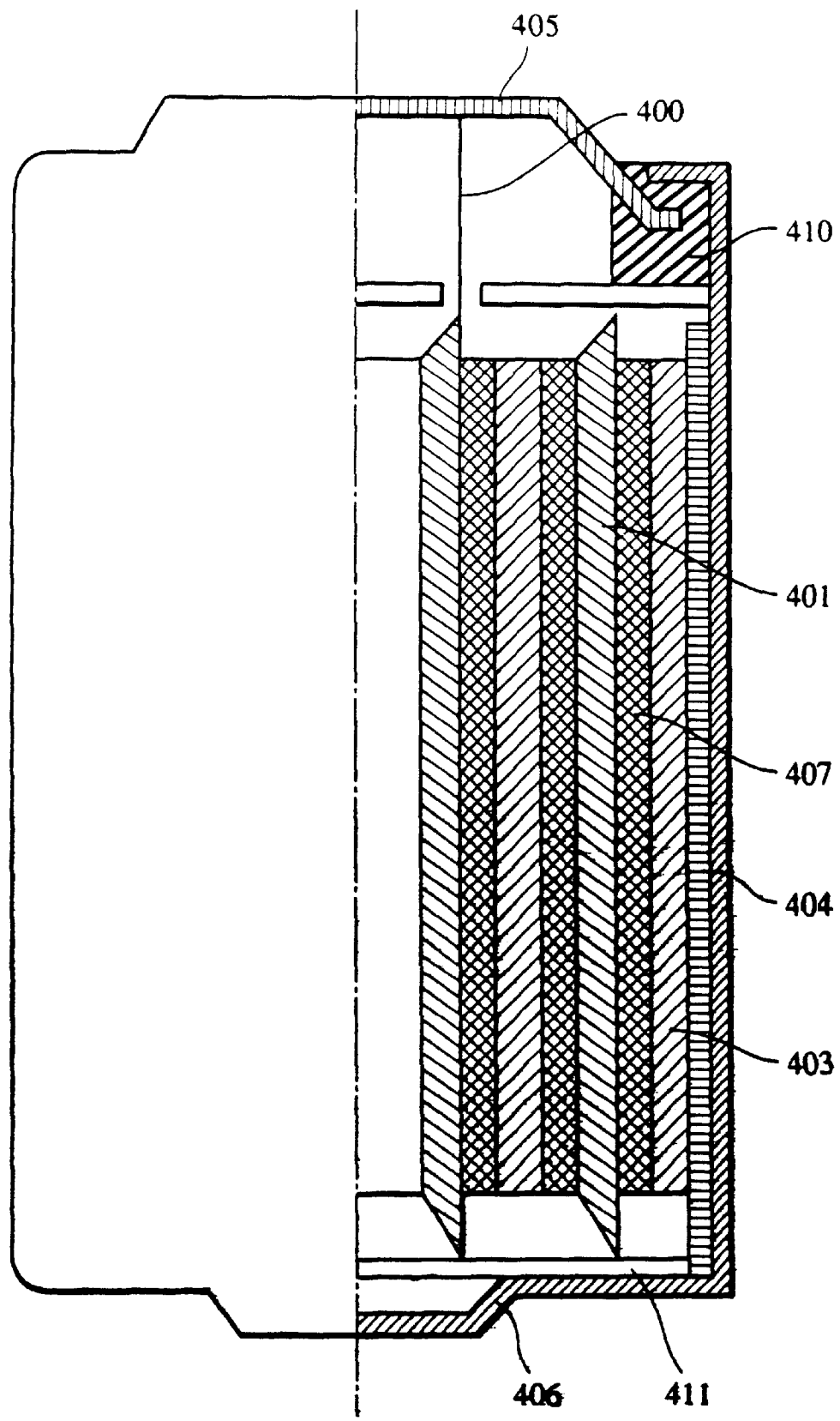
FIG. 4 is a schematic sectional view of a cylindrical cell of a spiral structure, which illustrates an example of the configuration thereof.

Moreover, there are two types of the structures of the cell of the present invention, namely, a mono-layer type and a multilayer type. Further, FIGS. 3 and 4 are schematic sectional views of examples of a monolayer flat cell and a spiral cylindrical cell having a spiral structure, respectively. In these figures, reference numerals 300 and 400 designate negative electrode collectors; 301 and 401 negative active materials; 303 and 403 positive active materials; 305 and 405 negative electrode terminals (negative electrode caps); 306 and 406 positive electrode cans; 307 and 407 separators with electrolytes; 310 and 410 insulating packing materials; and 411 an insulating plate. When assembling each of the cells illustrated in these figures, for example, the separator 307 (or 407) is sandwiched between the negative active material 301 (or 401) and the molded positive active material 303 (or 403) and these are then integrated into the positive electrode can 306 (or 406). Subsequently, the electrolyte is injected thereinto. Thereafter, the negative electrode cap 305 (or 405) and the insulating packing 310 (or 410) are put together and subjected to caulking treatment so as to complete the cell. Incidentally, it is preferable that the preparation of a material of a lithium cell, as well as the assembling of the cell, is performed in the dry air, from which water contents have been sufficiently removed, or in a dry inert gas. Further, a fluororesin, a polyamide resin, a polysulfon resin and various kinds of rubber can be used as materials of the insulating packing materials 310 and 410. Moreover, in addition to the method having the step of caulking the cap of a cell by use of a gasket such as an insulating packing as illustrated in FIGS. 3 and 4, methods respectively using a sealed tube and an adhesive, a welding method and a soldering method may be used as a method of sealing the cell. Furthermore, various kinds of organic resin materials and ceramic materials are preferably used as a material of the insulating plate of FIG. 4.

Additionally, stainless steel, especially, titanium clad stainless, copper clad stainless, nickel-plated steel plate or the like are used as the materials of an outer can of the cell, namely, the positive electrode cans 306 and 406 and the negative electrode cans 305 and 405 of the practical cell. In the cases of the cells of FIGS. 3 and 4, the positive electrodes 306 and 406 serve as battery housings (or cell housings). In addition to stainless steel, metals such as zinc, plastics such as polypropylene, and composite materials of metals, glass fibers and plastics may be used as a material of the battery or cell housings.

Incidentally, generally, a safety or relief valve (not shown in FIGS. 3 and 4) made of rubber, a spring, a metallic ball or a rupture disk (or foil) may be provided in the cell.

Hereinafter, the preferred embodiments or examples of the present invention will be described in further detail. The present invention is not limited to these examples.

EXAMPLE 1

A lithium secondary cell, which can be easily assembled and has a simple structure whose section is schematically illustrated in FIG. 3, was made as Example 1. First, nickel-aluminum alloy (Ni:Al=50:50 (namely, an element ratio expressed in percent of weight between these metals)) was made by adding aluminum powder to a nickel-chloride solution heated to 65 degrees centigrade. Subsequently, this alloy was dipped into a 2 percent sodium hydroxide solution, in which 0.05 mol of tungsten trioxide was contained, and was then etched. Thus a porous nickel-aluminum alloy, the specific surface area of which was 100 $m^2/g$ (evaluated according to BET method), was obtained. Further, a paste was obtained by mixing 3 weight percent acetylene black, which served as a conductive auxiliary agent, and 5 weight percent polyvinylidene fluoride, which served as a binding agent, with this alloy powder and then kneading this mixture and N-methyl pyrrolidone. Moreover, this paste was applied onto a nickel foil by using a coater and was then dried. Thereafter, a negative electrode was obtained by performing a pressing process on the dried paste. Incidentally, a lithium manganese oxide was prepared as the positive active material by mixing electrolytic manganese dioxide and lithium carbonate at a ratio of 1:0.4 by weight and then heating this mixture to 800 degrees centigrade. Subsequently, 3 weight percent carbon powder of acetylene black and 5 weight percent polyvinylidene fluoride were mixed with the prepared lithium-manganese oxide. Then, N-methyl pyrrolidone was added to this mixture. Thereafter, a paste-like material was prepared from such a mixture.

Subsequently, such a paste-like material was applied onto an aluminum foil and was further dried. Thus a positive electrode was formed. Additionally, a solution, which was made by dissolving 1 M (namely, 1 mol/l) of tetrafluoro-lithium-borate into a solvent obtained by mixing equal amounts (or parts) of polypropylene carbonate (PC) and dimethoxyethane (DME), was used as the electrolyte solution 307. A separator obtained by sandwiching a nonwoven fabric made of polypropylene between micropore films made of polypropylene was used as the separator 307. The assembling of the cell was performed in an atmosphere of a dry argon gas. A separator 307 was inserted between the negative electrode 301 and the positive electrode 303. This separator was inserted into the positive electrode can 306 made of titanium clad stainless steel. Then, the electrolyte solution was injected thereinto. Thus, this lithium secondary cell was formed by being hermetically sealed with the negative electrode cap 305 made of titanium clad stainless steel and with the insulating packing 310 made of fluorine-containing rubber.

EXAMPLE 2

Another lithium secondary cell, which can be easily assembled and has a simple structure whose section is schematically illustrated in FIG. 3, was made as Example 2. First, the negative electrode thereof was made by performing the following steps. Porous copper aluminum alloy powder, whose specific surface area was 50 $m^2/g$ (evaluated according to the BET method), was first obtained by etching copper aluminum alloy powder (R-30A) manufactured by Nikko Rika Corp. similarly as in the case of Example 1. Subsequently, a paste was obtained by mixing 3 weight percent acetylene black and 5 weight percent ethylene-propylene-dien-terpolymer and then kneading this mixture and xylene. Moreover, this paste was applied onto a nickel foil by using a coater and was then dried. Thereafter, a negative electrode was obtained by performing a pressing process on the dried paste. Thereafter, the same procedure as in the case of Example 1 was performed to thereby assemble the cell of FIG. 3.

EXAMPLE 3

Another lithium secondary cell, which can be easily assembled and has a simple structure whose section is schematically illustrated in FIG. 3, was made as Example 3. The negative electrode was made by performing the procedure similar to Example 1 except that first, porous nickel aluminum alloy powder as obtained in the case of Example 1 is immersed into a polytungustic acid solution and was then dried and thus the micro-capsulation thereof was performed. Thereafter, the same procedure as in the case of Example 1 was performed to thereby assemble the cell of FIG. 3.

EXAMPLE 4

Still another lithium secondary cell, which can be easily assembled and has a simple structure whose section is schematically illustrated in FIG. 3, was made as Example 4. First, the negative electrode thereof was made by performing the following steps. Namely, a paste was first obtained by mixing 3 weight percent acetylene black and 5 weight percent polyvinylidene fluoride with copper aluminum alloy powder (R-30A) manufactured by Nikko Rika Corp. and then adding N-methyl pyrrolidone to this mixture. Subsequently, this paste was applied onto a nickel foil by using a coater and was then dried. Then, the negative electrode was obtained by performing a pressing process on the dried paste and next etching this paste similarly as in the case of Example 1 and subsequently, performing a pressing process on this paste again. Thereafter, the same procedure as in the case of Example 1 was performed to thereby assemble the cell of FIG. 3.

EXAMPLE 5

Yet another lithium secondary cell, which can be easily assembled and has a simple structure whose section is schematically illustrated in FIG. 3, was made as Example 5. First, the negative electrode thereof was made by performing the following steps. Namely, nickel-aluminum alloy (Ni:Al= 20:80 (namely, an element ratio expressed in percent of weight between these metals)) was made by adding aluminum powder (300 mesh or under) to a nickel-chloride solution heated to 65 degrees centigrade. Subsequently, this alloy was dipped into a mixed solution of phosphoric acid, nitric acid and acetic acid (15:1:2.5) and was then etched. Thus a porous nickel-aluminum alloy, the specific surface area of which was 180 $m^2/g$ (evaluated according to BET method), was obtained. Further, a paste was obtained by mixing 3 weight percent acetylene black and polytetrafluoroethylene with this alloy powder and then this mixture was pressed into a nickel mesh by using a heating roller. Subsequently, the coat formed on the surface of the pressed mixture was made by spin-coating a solution obtained by adding the electrolyte solution used in Example 1 to a xylene solution of a 3 weight percent powder fuluororesin coating "SUPER KONAC F" (Trademark, made by Nippon Oil and Fats, Co., Ltd.). The resultant was subjected to drying the obtained solution at 150 degrees centigrade under reduced pressure. Thus, a negative electrode was made. Thereafter, the same procedure as in the case of Example 1 was performed to thereby assemble the cell of FIG. 3.

EXAMPLE 6

Yet another nickel-zinc secondary cell, which can be easily assembled and has a simple structure whose section is schematically illustrated in FIG. 3, was made as Example 6. First, the negative electrode thereof was made by performing the following steps. Namely, powder of a nickel-zinc alloy (Ni:Zn=10:90 (which is an element ratio expressed in percent of weight between these metals)) was made by adding zinc powder (200 mesh or under) to a 5 weight percent nickel-nitrate solution heated to 90 degrees centigrade. Next, this alloy powder was dipped into a 2 percent sodium hydroxide solution, in which 0.05 mol of tungsten trioxide was contained, and was then etched. Thus, a porous nickel-zinc alloy, the specific surface area of which was 50 $m^2/g$ (evaluated according to BET method), was obtained. Further, a paste was obtained by mixing 3 weight percent acetylene black and 1 weight percent poly(vinylalcohol) with this alloy powder and then kneading this mixture and ethylene glycol. Moreover, this paste was applied onto a nickel-plated iron punching metal member by using a coater and was then dried. Thereafter, a negative electrode was obtained by performing a pressing process on the dried paste. On the other hand, a positive electrode was obtained as follows. Namely, a paste obtained by mixing nickel powder #255, which was made by INCO Selective Surfaces, Inc., with a methyl cellulose solution was first applied onto a nickel-plated iron perforation plate and was then dried. Subsequently, such a paste was sintered at 900 degrees centigrade. As a result, a nickel sintered plate was obtained. This sintered plate was next dipped in a nickel-nitrate solution (at 50 degrees centigrade) and was then dried. Subsequently, this sintered plate was made to react in a sodium hydroxide solution. Such a step was repeatedly performed. Thus, the sintered plate, the pores of which were filled with nickel hydroxide, was obtained as the positive electrode. Further, a 30 weight percent potassium hydroxide solution was used as the electrolyte solution. Incidentally, a separator obtained by sandwiching a nonwoven fabric made of polypropylene between micropore films made of polypropylene was used. The assembling of the nickel-zinc secondary cell was performed by inserting a separator between the negative electrode and the positive electrode, then inserting this separator into the positive electrode can made of titanium clad stainless steel, subsequently injecting the electrolyte solution thereinto and thereafter hermetically sealing this nickel-zinc secondary cell with the negative electrode cap made of titanium clad stainless steel and with insulating packing 310 made of fluorine-containing rubber.

Incidentally, one kind of lithium-manganese-oxide was used for estimating the performance of the negative electrode as the positive active materials of Examples 1 to 5. The positive active materials of Examples 1 to 5 are not limited thereto. Various kinds of positive active materials such as lithium-nickel oxide and lithium-cobalt oxide may be employed. Further, Comparative Examples 1 to 4 were made as follows. Moreover, the comparison estimation among each of Examples 1 to 6 and Comparative Examples has been conducted. The following results have been obtained.

Comparative Example 1

A cell having a structure, whose section is schematically illustrated in FIG. 3, was made as Comparative Example 1 by using an aluminum foil instead of the negative electrode of Example 1 and performing the procedure similar to that in the case of EXAMPLE 1.

Comparative Example 2

Another cell having a structure, whose section is schematically illustrated in FIG. 3, was made as Comparative Example 2 by using an aluminum foil manufactured by Toyo Aluminum Co., Ltd., the surface portion of which was etched, instead of the negative electrode of Example 1 and performing the procedure similar to that in the case of Example 1.

Comparative Example 3

A cell having a structure, whose section is schematically illustrated in FIG. 3, was made as Comparative Example 3 by using a graphite negative electrode instead of the negative electrode of Example 1 and performing the following procedure. The graphite negative electrode was made by first performing a heat treatment on natural graphite powder at 2000 degrees centigrade in the presence of an argon gas, then mixing 3 weight percent acetylene black and 5 weight percent polyvinylidene fluoride with this natural graphite powder, and subsequently adding N-methyl pyrrolidone to this mixture so as to prepare a paste-like material, and thereafter applying this paste-like material on a copper foil and finally, drying such a paste-like material at 150 degrees centigrade under reduced pressure.

Comparative Example 4

A cell having a structure, whose section is schematically illustrated in FIG. 3, was made as Comparative Example 4 by using a zinc negative electrode instead of the negative electrode of Example 6 and performing the following procedure. Namely, a paste was obtained by mixing 3 weight percent acetylene black and 1 weight percent poly (vinylalcohol) with zinc powder and zincoxide, and then kneading this mixture and ethylene glycol. Moreover, this paste was applied onto a nickel-plated iron punching metal member by using a coater and was then dried.

Thereafter, a negative electrode was obtained by performing a press processing on the dried paste.

Incidentally, in the case of each of Comparative Examples 1 to 4, the specific surface area was less than 10 m$^2$/g.

(Performance Evaluation of Lithium Secondary Cell)

The performance of each of lithium secondary cells made as Examples 1 to 5 and Comparative Examples 1 to 3 was evaluated by performing a charge-and-discharge cycle test under the following conditions and making comparisons among the performance of each of the cells of Examples 1 to 5 and the performance of Comparative Examples 1 to 3. The conditions for the cycle test are as follows. Namely, the charge and discharge were alternately repeated under the condition of 0.5 C. (electric current of 0.5 time the electric capacity per an hour based on the electric capacity calculated from the amount of the positive active material). The cut-off voltage in the case of charging was 4.5 V. After charging, a 30-minute break was taken. The cut-off voltage in the case of discharging was 3.0 V. Incidentally, "HJ-106M" made by Hokuto Denko Corp., Ltd. was used as a charge and discharge apparatus. Additionally, the charge and discharge test was started by performing charging. The capacity of the cell is the discharge capacity corresponding to the third discharge operation. The cycle life was the number of times of cycles at which the charging voltage reaches 4.5 V.

(Performance Evaluation of Nickel-zinc Secondary Cell)

The performance of each of nickel-zinc secondary cells made as Example 6 and Comparative Example 4 was evaluated by performing a charge-and-discharge cycle test under the following conditions and making comparisons among the performance of each of the cells of Example 6 and the performance of Comparative Example 4. The conditions for the cycle test are as follows. Namely, the charge and discharge were alternately repeated under the condition of 0.5 C. (electric current of 0.5 time the electric capacity per an hour based on the electric capacity calculated from the amount of the positive active material). The charging was performed for a period of 2.5 hours. After charging, a 30-minute break was taken. The cut-off voltage in the case of discharging was 1.0 V. Incidentally, "HJ-106M" made by Hokuto Denko Corp., Ltd. was used as a charge and discharge apparatus. Additionally, the charge and discharge test was started by performing charging. The capacity of the cell is the discharge capacity corresponding to the third discharge operation. The cycle life was defined as terminating when 60 percent of the charging capacity corresponding to the third discharge operation was reached.

The results of the performance evaluation concerning the energy density per unit volume and the cycle life of the lithium secondary cells made by using the negative electrode of the present invention, namely, the cells of Examples 1 to 5 and Comparative Examples 1 to 3 are shown in Table 1 by normalizing each of the discharging capacity of the cell of Comparative Example 3 and the cycle life of the cell of Comparative Example 1 as 1.0. Further, the results of the performance evaluation concerning the energy density per unit volume and the cycle life of the nickel-zinc secondary cells made by using the negative electrode of the present invention, namely, the cells of Example 6 and Comparative Example 4 are shown in Table 2 where when normalizing each of the discharging capacity and the cycle life of the cell of Comparative Example 4 as 1.0. As is seen from the comparisons among the results in the cases of Examples 1 to 5 and Comparative Examples 1 and 2 shown in Table 1, the cycle life is increased by employing the secondary cells provided with the negative electrode of the present invention. Further, as is apparent from the comparisons among the results in the cases of Examples 1 to 5 and the result of Comparative Example 3, the lithium secondary cell having the energy density higher than the conventional cell provided with the carbon negative electrode can be made. Moreover, as is evident from the comparison between the results in the cases of Example 6 and Comparative Example 4, the cycle life can be increased and nickel zinc secondary cell having high energy density can be made.

TABLE 1

|  | Discharging Capacity | Cycle Life |
|---|---|---|
| Secondary Cell of Example 1 | 1.4 | 3.3 |
| Secondary Cell of Example 2 | 1.3 | 2.5 |
| Secondary Cell of Example 3 | 1.4 | 2.1 |
| Secondary Cell of Example 4 | 1.4 | 2.7 |
| Secondary Cell of Example 5 | 1.6 | 3.3 |
| Secondary Cell of Comparative Example 1 | 1.4 | 1.0 |
| Secondary Cell of Comparative Example 2 | 1.5 | 1.0 |
| Secondary Cell of Comparative Example 3 | 1.0 | 3.4 |

TABLE 2

|  | Discharging Capacity | Cycle Life |
|---|---|---|
| Secondary Cell of Example 6 | 1.3 | 3.0 |
| Secondary Cell of Comparative Example 4 | 1.0 | 1.0 |

As described above, the negative electrode of the secondary cell of the present invention is made of the powder of the alloy of the amphoteric metal, which can be easily formed as porous. Thereby, the growth of a dendrite produced in the secondary cell by increasing the specific surface area is retarded. Moreover, the life or length of the cycle of the charge and discharge can be increased. Furthermore, a secondary cell having high capacity and high energy-density can be obtained.

Further, the effects of inhibiting an occurrence of a dendrite can be further enhanced by coating the surface of the negative electrode with a film made of an insulating material or a semiconductor material which neither is neither soluble in an electrolyte solution nor reacts with the electrolyte and is permeable to ions involved in a cell reaction but not permeable to lithium or zinc metal obtained as a negative active material by the electrodeposition.

Moreover, a high specific surface area can be easily obtained by selectively etching and removing the amphoteric metal from the alloy of the metallic powder.

Furthermore, the etched powder of the alloy of the amphoteric metal can be safely handled without greatly reducing the specific surface area thereof by microcapsulating the powder with the coating or film made of an insulating material or a semiconductor material which neither reacts with the electrolyte and is nor soluble in an electrolyte solution and is thus stable and permeable to ions involved in a cell reaction.

Additionally, this powder of the alloy of the amphoteric metal is used in a secondary cell having a lithium or zinc negative electrode. Thereby, the lithium or zinc negative active material, which is deposited on the surface of the powder of the alloy of the etched amphoteric metal at the time of charging, can be prevented from directly coming in contact with the electrolyte solution. Consequently, there can be obtained a secondary cell, the performance of which is never degraded.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A secondary cell which is one of a zinc secondary cell, a nickel-zinc secondary cell, an air-zinc secondary cell and a bromine-zinc secondary cell, the secondary cell comprising a positive electrode and a negative electrode separated from each other by a separator in an electrolyte contained in a case therefor, wherein the negative electrode comprises a metallic powder of nickel alloyed with zinc which reacts with an acid and an alkali, such that the element ratio expressed in percent of weight of nickel to zinc is more than $(10/90) \times 100\%$ and equal to or less than 60%.

2. A secondary cell according to claim 1, wherein a particle diameter of the metallic powder is equal to or less than 100 $\mu$m.

3. The secondary cell according to claim 1, wherein the metallic powder is micro-capsulated with a coating.

4. The secondary cell according to claim 3, wherein the coating is made of a material which neither reacts with the electrolyte nor is soluble in an electrolyte solution and thereby is stable and is permeable to ions involved in a cell reaction but is resistant to oxidizing in the presence of oxygen.

5. The secondary cell according to claim 4, wherein the coating is made of an insulating material or a semiconductor material, which has a molecular structure comprising clearances larger than the ions involved in the cell reaction or comprises pores.

6. The secondary cell according to claim 4, wherein the material of the coating is a metallic oxide.

7. The secondary cell according to claim 6, wherein the metallic oxide is one or more oxides of at least one metal selected from the group consisting of tungsten, molybdenum, titanium, vanadium, niobium, zirconium, hafnium, tantalum and chromium.

8. The secondary cell according to claim 5, wherein the material of the coating is an organic polymer.

9. The secondary cell according to claim 8, wherein the organic polymer is an organic polymer of the group consisting of a fluororesin, a silicone resin, a polyolefin of polyethylene or polypropylene, a titanium resin, a polymer of derivatives of an m acrocyclic compound, a polymer of derivatives of aromatic hydrocarbon.

10. The secondary cell according to claim 3, wherein the material of the coating is a composite material of a metallic oxide and an organic polymer.

11. The secondary cell according to claim 1, wherein a surface of the negative electrode is coated with a film which is neither soluble in an electrolyte solution nor reacts with the electrolyte and is permeable to ions involved in a cell reaction but is not permeable to zinc metal obtained as a negative active material by electrodeposition.

12. The secondary cell according to claim 11, wherein the film has a distribution peak of the diameters of the pores within a range of 0.15 to 100 nanometers.

13. The secondary cell according to claim 11, wherein the coated film is one of an insulating film and a semiconductor film.

14. A secondary cell according to claim 1, wherein a specific surface area of the metallic powder is equal to or more than 10 $m^2/g$.

15. A secondary cell which is one of a zinc secondary cell, a nickel-zinc secondary cell, an air-zinc secondary cell and a bromine-zinc secondary cell, the secondary cell comprising a positive electrode and a negative electrode separated from each other by a separator in an electrolyte contained in a case therefor, wherein the negative electrode comprises a metallic powder of at least one metal selected from the group consisting of copper and titanium alloyed with at least zinc which reacts with an acid and an alkali, such that the element ratio expressed in percent of weight of metals to zinc is equal to or less than 60%.

16. The secondary cell according to claim 15, wherein a particle diameter of the metallic powder is equal to or less than 100 $\mu$m.

17. The secondary cell according to claim 15, wherein the metallic powder is micro-capsulated with a coating.

18. The secondary cell according to claim 15, wherein a surface of the negative electrode is coated with a film which is neither soluble in an electrolyte solution nor reacts with the electrolyte and is permeable to ions involved in a cell reaction but is not permeable to zinc metal obtained as a negative active material by electrodeposition.

* * * * *